United States Patent

[11] 3,550,732

[72] Inventor Albert Beller
    Bad Vilbel, Germany
[21] Appl. No. 730,381
[22] Filed May 20, 1968
[45] Patented Dec. 29, 1970
[73] Assignee Alfred Teves GmbH
    Frankfurt am Main, Germany
    a corporation of Germany
[32] Priority May 20, 1967
[33] Germany
[31] No. T33900

[54] WEAR COMPENSATOR FOR DISK BRAKE
    9 Claims, 4 Drawing Figs.
[52] U.S. Cl. .................................................... 188/196,
    188/71.9
[51] Int. Cl. ..................................................... F16d 65/56,
    S16d 55/18
[50] Field of Search ........................................... 188/72,
    73C, 196PRR, 71.9

[56] References Cited
UNITED STATES PATENTS
1,370,841 3/1921 Redford .................. 188/196(PRR)
3,244,260 4/1966 Frayer ..................... 188/196(PRR)
3,442,357 5/1969 Farr ........................ 188/196(PRR)

Primary Examiner—Duane A. Reger
Attorney—Karl F. Ross

ABSTRACT: A wear-compensating disc brake in which the wheel brake cylinder is actuatable both hydraulically and mechanically to urge the piston and its brakeshoe against the disc. A threaded spindle extends axially through the piston while a threaded sleeve is provided on its exterior with followers and engages, during the intake stroke of the piston and its advance beyond a desired brake play, a cooperating adjustment ring whereby the linear motion is transformed into rotational motion advancing the spindle and establishing a new rest position for the piston corresponding to the brake lining wear.

INVENTOR.
ALBERT BELLER
BY
Karl F. Ross
ATTORNEY

INVENTOR.
ALBERT BELLER
BY
Karl G. Ross
ATTORNEY

WEAR COMPENSATOR FOR DISK BRAKE

My present invention relates to hydraulic vehicle brakes and, more particular, to disc-brake systems having a hydraulically and/or mechanically operable piston-and-cylinder arrangement provided with a self-adjusting mechanism for repositioning the piston upon wear of the brake lining.

It has already been proposed to provide so-called self-adjusting mechanisms in vehicle brakes and the like where, upon wear of the brake lining, the piston member is automatically reset as to its rest position to reestablish and maintain a predetermined brake play. One way of providing reliable adjustment, either continuously or intermittently, is to interpose an elastically deformable element between the regulating mechanism and the piston member or another brake member. Substantially ineffective at normal brake power, the element is compressed upon development of excessive brake power of the type tending to cause illusory brake play and prevents overcompensation. The drawback of this arrangement is that it requires additional space, and that the surfaces contiguous to and forming seats for the deformable resilient element are subject to rapid deterioration.

In such known self-adjusting mechanisms, the maintenance of accurate brake play is particularly difficult to achieve because relatively large forces have to be transmitted to bodies which, for structural reasons, must be small-dimensioned and are deformable and subject to wear.

It is, therefore, an important object of the present invention to obviate the drawbacks of prior art and to provide a brake system of the general character described, in which a substantially uniform brake play is maintained independently of the wear of the brake lining and of deformation of the brake housing.

Another object of the present invention is to provide an improved brake system of the general character described which precludes overadjustment or underadjustment of the brake.

A further object is to provide, within a limited space, an improved brake arrangement of the general character described, in which the adjusting mechanism is protected against significant wear.

These objects and others which will become apparent hereinafter are attained, in accordance with the present invention, by providing a self-adjusting mechanism for a disc-type brake in which a threaded spindle member passes axially into a piston shiftable in the cylinder to drive a proximal brakeshoe against a brake disc which is rotatable about an axis parallel to the axis of the cylinder. The spindle is admitted inside the piston through an opening in the cylinder wall remote from the brakeshoe. On the far side of the wall the unthreaded shank of the spindle may terminate in a rod or the like which is linked to mechanical brake means such as a lever in the region of the driver's seat and which is formed as an emergency, a locking or a parking brake.

Inside the piston, the spindle cooperates with an axially shiftable sleeve member which bears against a piston lining or cage conformingly fitting into the hollow interior of the piston.

Radial projections along the outer peripheral surface of the sleeve cooperate with corresponding projections attached on the interior surface of a cylindrical adjustment ring surrounding the sleeve. The projections, which have a generally sloping declination, form pairs of inclined planes or followers, each of which has a longitudinal width less than the pitch of the rib and rests against an arcuately disposed expansion spring.

Advance of the piston beyond a predetermined brake play, which would indicate wear of the brake lining, drives the sleeve against the cooperating adjustment ring. The angular force imparted to the inclined planes of the followers on the ring compresses the expansion springs, causes the sleeve to rotate, in accordance with the pitch of the spindle, and advances the rest position of the piston. Rotation of the sleeve in the opposite (backward) direction is prevented by a camming device on the periphery of the adjustment ring. The device comprises camming rollers accommodated on camming ramps whose shape is such that the rollers are wedged outwardly at incipient rotation in the "forbidden" sense into a narrow space between the ramps and rim of the ring where further motion becomes impossible. Rotation in the "permitted" sense places the rollers into the conformingly shaped portion of the ramp troughs where they do not hinder the forward revolution. The system thus constitutes a unidirectional clutch.

While the invention has been found to be especially advantageous with respect to so-called fixed-yoke disc brakes, the principle is also applicable to floating-yoke disc brakes or to drum-type brakes using outwardly displaceable arcuate brakeshoes.

The above and other objects, features and advantages of my invention will become more readily apparent from the following description, reference being made to the accompanying drawing in which.

Figure 1:
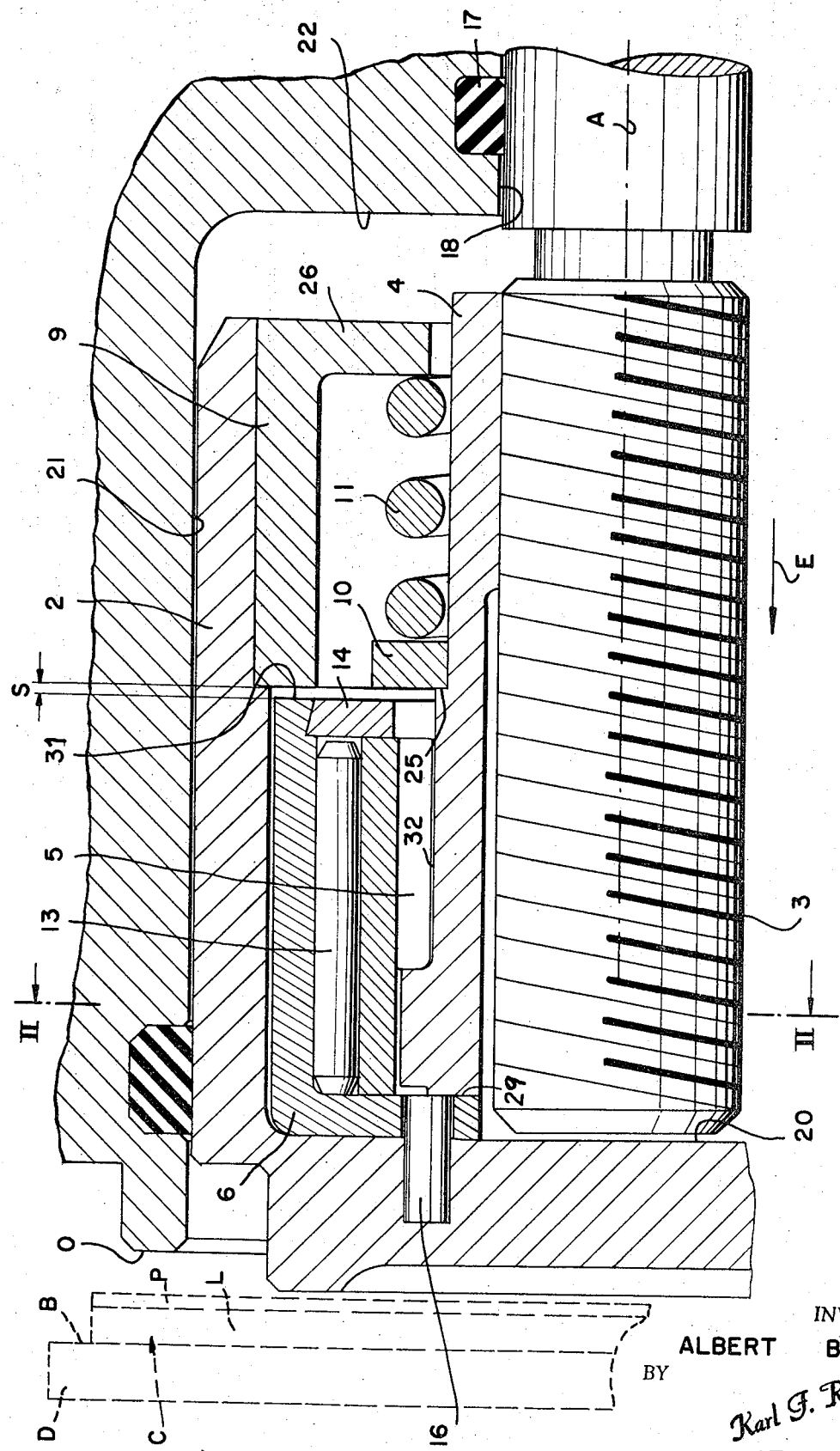
FIG. 1 is an axial cross-sectional view through part of a wheel-brake cylinder of a disc-brake system in accordance with the present invention, other portions of the brake being shown in dot-dash lines.

In FIG. 1, I show one-half of a piston-and-cylinder assembly of a disc-brake system together with self-adjusting wear-compensating means according to the invention. It should be understood that the arrangement described hereinafter may be identical with that of the corresponding half of the brake housing on the opposite side of the brake disc when the yoke is of the stationary or fixed type. When the housing is formed as a floating yoke adapted to transmit reaction forces to a remote brakeshoe, or when the disc is axially shiftable, only one adjusting means need be used.

In the illustrated disc-brake system, a wheel brake cylinder 21 formed in the brake yoke or housing 1 is centered upon an axis A perpendicular to the braking face B of the brake disc D against which a brakeshoe C is urgeable by a piston 2. The brakeshoe C comprises a backing plate P and a brake lining L of conventional construction. It will be apparent that any of the common types of brakeshoe and housing structures may be employed here.

The piston 2 is axially slidable in the cylinder 21 which is connected via an intake port I (FIG. 4) with the corresponding chamber of a hydraulic master cylinder which may be of the type described in "PRINCIPLES OF AUTOMOTIVE VEHICLES," U.S. Government Printing Office, Washington, D.C., 1956, p. 437 ff.

The piston 2 is hollow and receives the coaxially extending spindle 3. The spindle 3, forming an extension of a manually operated brake device, passes slidable through a cylindrical passage 18.

A sleeve 4, threadedly engaging the spindle 3 on which it is mounted, has a shoulder 25 at a point approximately midway of its length against which a spring-seating ring 10 abuts. Ring 10 forms the seat for a spring 11 of the helical compression type. At its opposite end the spring 11 rests against the flange 26 of a sleeve 9 which, though structurally part of the piston 2, is shown as a separate unit, used thusly to facilitate the assembly of the mechanism.

The end of sleeve 4 which is proximal to the brakeshoe abuts against the face 29 of a cage 6 which lines approximately one-half of the cup-shaped interior of the piston 2 in the vicinity of the brakeshoe. The cage is nonrotatably attached to the piston 2 by the pin 16. The open end of the cage 6 is closed off by a stop ring 14, wedged into the circular aperture, and an adjustment ring 5 fitting into the central opening of the top stop ring 14 and axially projecting through the latter into the cage 6 where it is received in a recess 32 between the cage and the sleeve 4.

Figure 3:
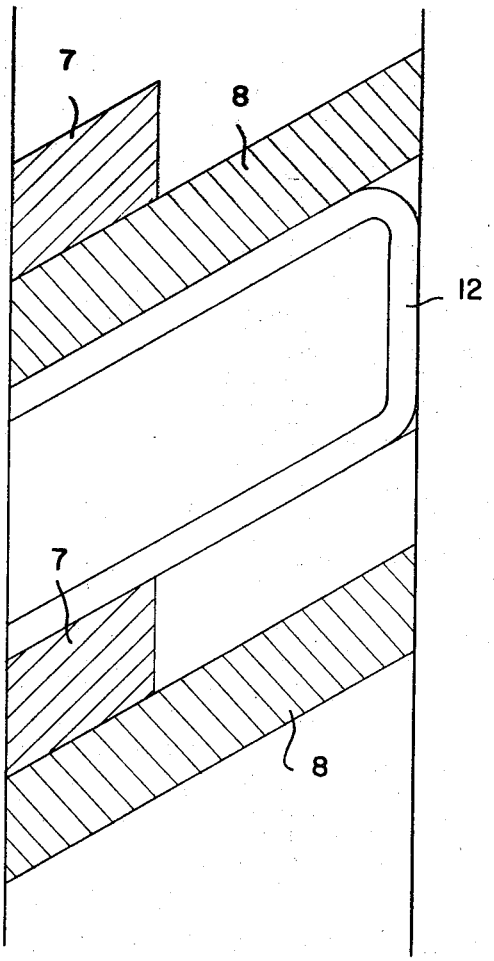
FIG. 3 is an enlarged perspective view of part of the projection shown in FIG. 2.

Each of a plurality of equispaced camming ramps 15 on the outer periphery 34 of the adjustment ring 5 is formed with a concave section resembling a trough for a camming roller 13. The trough is provided with flanks 32 and 33, the former being slightly inclined with respect to the periphery 34 while the other is substantially radial. The inner periphery 35 of the ring 5 is formed with a plurality of followers 8 which are paired with corresponding followers 7 formed on the outer periphery 36 of the sleeve 4. Each pair of followers cooperates with a hairpin-shaped expansion spring 12. The angular width of the followers 8 on the ring 5 is equal to that of the corresponding followers 7 projecting out from the sleeve 4 as shown in FIG. 3 but the spacing is about three times as great. The width differential is necessary to establish clearance for the spring 12 to expand.

Figure 2:
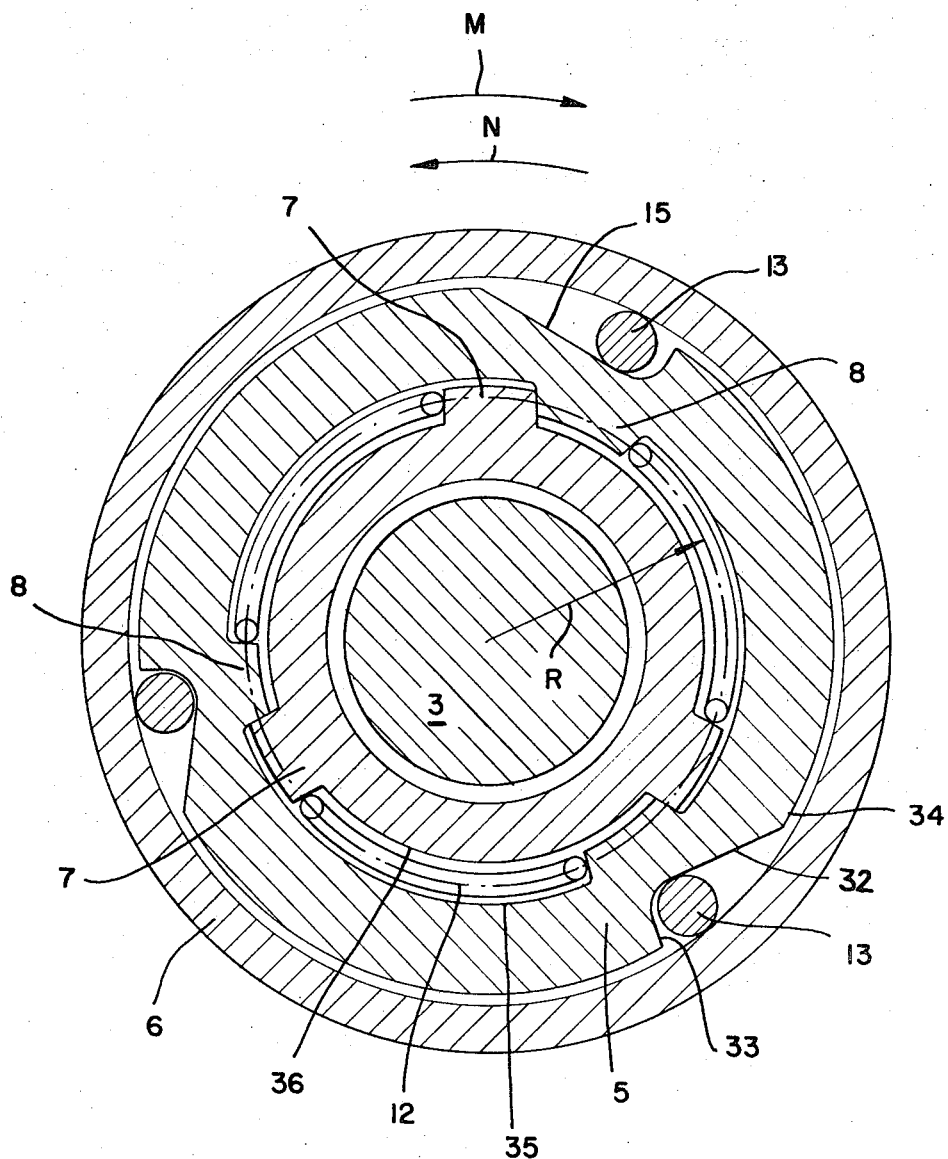
FIG. 2 is a cross-sectional view taken on the line II—II of FIG. 1.

FIG. 2 shows an array of three pairs of followers and three expansion springs annularly disposed about the outer periphery of the sleeve 4 and the inner periphery of the surrounding ring 5, respectively.

During normal brake operation, assuming no wear of the lining L of the brakeshoe C, the piston 2 is urged to the left (arrow E) to bring the brakeshoe C into engagement with the disc D. The socket 9 moving along with the piston 2 through a distance which is proportional to the brake play S is thereby juxtaposed against the face 31 of the cage 6 without, however, exerting any pressure against the latter. The piston motion thus does not displace the cage 6 or the elements cooperating with it, e.g. the ring 5 and the sleeve 4 either axially or rotationally. Upon deactivation of the brake, the piston is returned to its unchanged rest position.

Figure 4:
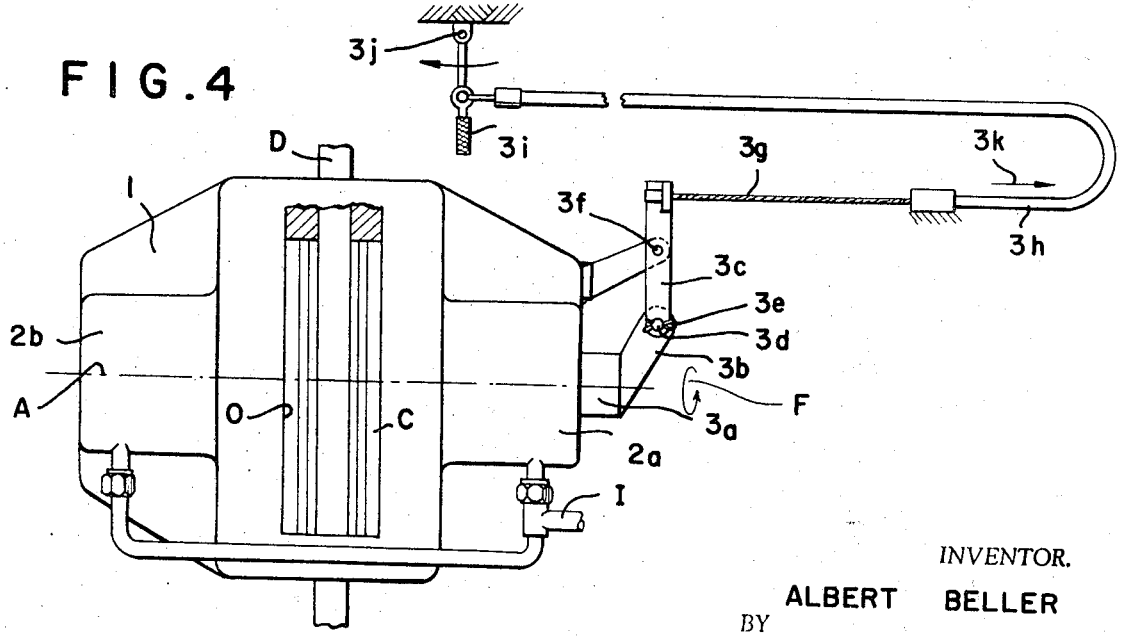
FIG. 4 is an elevational view of the brake.

In FIG. 4, I have shown the overall arrangement of the system in which the yoke 1 or housing is secured to the axle housing of a vehicle and has a pair of cylinders as, for example, represented at 2a and 2b. The latter receives the automatic adjusting means whose spindle has an axially shiftable shank 3a emerging from the cylinder and carrying a lug 3b which is linked to the lever 3c via a pin 3d held in place by the cotter 3e. The lever 3c is fulcrumed at 3f to the housing 1 and is engaged by the bowden cable 3g whose sheath 3h extends to the region of the driver's compartment of the vehicle. The driver may then displace the actuating lever 3i, which may be disposed beneath the dashboard, in the clockwise sense (FIG. 4) about its pivot 3j to draw the bowden cable in the direction of arrow 3k, swing the lever 3c in the clockwise sense and force the shank 3a of the threaded spindle 3 in the direction of arrow E (FIG. 1) to apply the brake. When it is necessary to reset the mechanism for replacement of the brakeshoe (with radial withdrawal of the latter through an opening 0 in the yoke 1), the cotter 3e is withdrawn and the pin 3d removed from the lug 3b; the latter may be rotated (arrow F) to shift the sleeve 4 in the direction opposite arrow E. Alternatively, the piston may be rotated in the counterclockwise sense (FIG. 2). Since the pin 16 couples the piston 2 with the cage 6, the cage is rotated in the direction of arrow N, whereupon the rollers 13 lock the cage 6 to the ring 5 which, in turn, acts against the sleeve 4 to shift the latter backwardly onto the spindle 3.

In summary, therefore, the adjusting means of the brake of the present invention comprises a pair of mutually interengageable threaded members, one of which is axially entrained with the housing (e.g. via the levers 3a—3f), while the other is axially entrained with the piston 2 and acts thereagainst, one of the members being provided with at least one generally helical camming ramp (7) which slidably engages a camming ramp 8 of corresponding pitch and carried by the unidirectional clutch means 5, 13, 8 entrained with the piston 2. Relative axial displacement of the "other" members of the threaded assembly and the unidirectional clutch cammingly rotate the threaded members to reestablish the rest position of the piston. A lost motion is provided between the piston and the unidirectional clutch, the lost motion establishing the brake play.

In the event of wear of the lining L of the brakeshoe C, the stroke of the piston 2 will exceed the brake play S previously established. When this occurs, the socket 9 is pressed with considerable force against the face 31 of the cage 6 and displaces the latter axially, together with the adjustment ring 5, in the direction of the arrow E. The pressure exerted against the inclined surfaces of the followers 8 and the cooperating equally inclined followers 7 is transformed into a rotational momentum which, opposed by the counteracting springs 12, advances the sleeve 4 via its threaded interior on the spindle 3 on which it is mounted. The new position of the sleeve assigns, through its abutment against the face 29 of the cage 6 lining the interior of the piston 2, to the piston on its return stroke a new forward position corresponding to the amount of brake lining wear.

Rotation of the sleeve 4 in the reverse (opposite) direction is prevented by a camming device disposed on the rim of the ring 5 which keeps the piston from returning to its original uncompensating position. Rotation of the ring 5 in the direction indicated by the arrow M keeps the camming rollers 13 freely movable in the trough formed by the concave arms 33 of the ramps 15, while rotation in the reverse direction indicated by the arrow N drives them into the narrow wedge between the flat arms 32 of the ramps 15 and the adjoining rim of the cage 6.

During a replacement of the brake lining, the rollers can be temporarily removed from the ramps 15 until the piston 2 or the spindle 3 are reset in their original positions.

The improvement described and illustrated is believed to admit of many modifications within the ability of persons skilled in the art, all such modifications being considered within the spirit and scope of the invention except as limited by the appended claims.

I claim:

1. In a brake system having a brakeshoe displaceable toward a braking face juxtaposed therewith, a housing with a hydraulic brake cylinder, a piston hydraulically displaceable in said cylinder for shifting said brakeshoe toward said braking face, and automatic adjusting means received in said cylinder for compensating wear of said brakeshoe and reestablishing a rest position of said piston in step with the wear of said brakeshoe, the improvement wherein:

said adjusting means comprises a pair of threadedly interconnected members received in said cylinder and interposed between said housing and said piston, one of said members being rotatable and the other of said members being substantially nonrotatable during normal brake operation;

the system further includes camming means axially shiftable in said cylinder for angularly displacing said rotatable member, thereby advancing same axially to reset said rest position of said piston, said camming means including at least one pair of slidingly engageable inclined guide surfaces of steep pitch; and means is provided on said piston for axially entraining said camming means only upon movement of said piston through a lost motion in excess of a predetermined brake play, said members including a spindle slidably received in said housing and extending axially into said cylinder, said piston being hollow and at least partly receiving said spindle, said rotatable member including a sleeve threaded onto said spindle and formed along its outer periphery with one of said guide surfaces, said camming means including a ring received in said piston and surrounding said outer periphery of said sleeve while being provided internally with the other of said guide surfaces.

2. The improvement defined in claim 1, further comprising unidirectional clutch means interposed between said ring and said piston for restricting rotation of said ring in one sense about the axis of said members and relatively to said sleeve, while allowing rotation of said ring in the opposite sense.

3. In a brake system having a brakeshoe displaceable toward a braking face juxtaposed therewith, a housing with a hydraulic brake cylinder, a piston hydraulically displaceable in said cylinder for shifting said brakeshoe toward said braking face, and automatic adjusting means received in said cylinder for compensating wear of said brakeshoe and reestablishing a rest position of said piston in step with the wear of said brakeshoe, the improvement wherein:

said adjusting means comprises a pair of threadedly interconnected members received in said cylinder and interposed between said housing and said piston, one of said members being rotatable and the other of said members being substantially nonrotatable during normal brake operation;

the system further includes camming means axially shiftable in said cylinder for angularly displacing said rotatable member, thereby advancing same axially to reset said rest position of said piston, said camming means including at least one pair of slidingly engageable inclined guide surfaces of steep pitch;

means is provided on said piston for axially entraining said camming means upon movement of said piston through a lost motion in excess of a predetermined brake play, said members including a spindle slidably received in said housing and extending axially into said cylinder, said piston being hollow and at least partly receiving said spindle, said rotatable member including a sleeve threaded onto said spindle and formed along its outer periphery with one of said guide surfaces, said camming means including a ring received in said piston and surrounding said sleeve while being provided internally with the other of said guide surfaces; and the system further comprises unidirectional clutch means interposed between said ring and said piston for restricting rotation of said ring in one sense about the axis of said members and relatively to said sleeve, while allowing rotation of said ring in the opposite sense, said unidirectional clutch means including a cage received in said piston, means restricting relative rotation of said cage and said piston, at least one roller in said cage, and a ramp formed on said ring for wedging said roller against said cage upon rotation of said ring in said other sense.

4. The improvement defined in claim 3 wherein a plurality of said rollers are provided in angularly equispaced relationship about said ring and said ring is formed with corresponding wedging ramps cooperating with said rollers.

5. The improvement defined in claim 4, further comprising spring means disposed between said sleeve and said ring for urging said guide surfaces into sliding engagement with one another.

6. The improvement defined in claim 5 wherein said ring is provided internally with a plurality of generally helically extending ribs angularly equispaced about its inner periphery by a distance in excess of the angular width of said ribs, and said sleeve is formed along its outer periphery with a plurality of angularly spaced helically extending ribs of an angular width and spacing equal approximately to the width and spacing of the ribs of said ring and of the pitch thereof, said ribs defining said guide surfaces.

7. The improvement defined in claim 6, further comprising spring means disposed between at least one rib of said sleeve and at least one rib of said ring for exerting circumferentially of said sleeve spring force retaining said ribs of said sleeve and said ring in slidable engagement with one another.

8. The improvement defined in claim 7 wherein the means for restricting relative rotation of said piston and said cage includes a pin transfixing said cage and received in said piston.

9. The improvement defined in claim 8 wherein said means on said piston includes a shoulder fixed to said piston and engageable with said cage, compression spring means interconnecting said sleeve and said piston for urging said cage and said shoulder apart.